United States Patent [19]

Davison

[11] 4,331,581
[45] May 25, 1982

[54] ELASTOSOL PASTES
[75] Inventor: Sol Davison, Houston, Tex.
[73] Assignee: Shell Oil Company, Houston, Tex.
[21] Appl. No.: 291,215
[22] Filed: Aug. 10, 1981
[51] Int. Cl.$^3$ ............................................. C08K 5/07
[52] U.S. Cl. .................................. 524/364; 525/314; 524/110; 524/360; 524/315; 524/363; 524/365; 524/379; 524/390
[58] Field of Search ..................... 260/32.8 R, 32.8 A, 260/27 BB, 31.2 MR, 30.4 A; 525/314
[56] References Cited
U.S. PATENT DOCUMENTS
3,792,005  2/1974  Harlan, Jr. ..................... 260/27 BB Primary Examiner—Joseph L. Schofer
Assistant Examiner—N. Sarofim
Attorney, Agent, or Firm—Dean F. Vance

[57] ABSTRACT

A process for forming a paste suitable for the preparation of dispersions and coatings is disclosed, said process comprising (1) dissolving a selectively hydrogenated monoalkenyl arene (A) - conjugated diene (B) block polymer in a first solvent, which first solvent is a good solvent for both the A blocks and the B blocks, (2) adding a second solvent to the solution, wherein said second solvent is a good solvent for the A blocks and a poor solvent for the B blocks, therein forming a suspension of micelles, and (3) adding a third solvent to the suspension of micelles, wherein said third solvent is a poor solvent for both the A blocks and the B blocks, therein forming an elastosol paste.

7 Claims, No Drawings

ELASTOSOL PASTES

BACKGROUND OF THE INVENTION

1. Field of the Invention

The invention relates to a process for preparing a polymeric paste suitable for the preparation of dispersions and coatings.

2. Description of the Prior Art

Coatings prepared with selectively hydrogenated monoalkenyl arene/conjugated diene block copolymers have been proposed in the past. For example, U.S. Pat. No. 3,792,005 discloses the combination of a selectively hydrogenated block copolymer having specified block molecular weights and a particular solvent having a solubility parameter of 7.5 to 9.2 $(cal/cm^3)^{\frac{1}{2}}$. The coatings of the '005 patent apparently have high tensile strength in combination with low solution viscosity. However, these coatings still must be applied to the substrate at relatively high solvent to polymer ratios. Today, such high solvent levels present environmental concerns, and special precautions must be undertaken to prevent pollution of the atmosphere.

A new process for applying coatings based on selectively hydrogenated monoalkenyl arene/conjugated diene block copolymer has been found. This new process permits the easy application of the coating to a substrate at very low solvent levels.

SUMMARY OF THE INVENTION

A process to produce a highly concentrated rubber in solvent suitable for surface coatings has been discovered. This form has been named an "elastosol". It has paste-like consistency and can easily be spread on a surface at room temperature. With subsequent heating, a thick strong coherent coating is formed. Specifically, the present process comprises:

(a) dissolving a block copolymer in a first solvent where said block copolymer comprises at least two monoalkenyl arene polymer end blocks A and at least one substantially completely hydrogenated conjugated diene polymer mid block B and said first solvent dissolves both the A blocks and the B block and has a Hildebrand's solubility parameter within the range of about 7 to about 9.2 $(cal/cm^3)^{\frac{1}{2}}$;

(b) adding a second solvent to the solution of step (a), wherein said second solvent is a good solvent for the A block and a poor solvent for the B block, and said second solvent has a Hildebrand's solubility parameter within the range of about 9.2 to about 10 $(cal/cm^3)^{\frac{1}{2}}$, therein resulting in the precipitation of the mid block B and the formation of a suspension of micelles; and (c) adding a third solvent to the suspension of micelles formed in step (b), wherein the third solvent is a poor solvent for both the end blocks A and the mid block B, and has a Hildebrand's solubility parameter greater than about 10 $(cal/cm^3)^{\frac{1}{2}}$, therein precipitating an elastosol paste.

In a specific embodiment, the block copolymer is a selectively hydrogenated styrene-butadiene-styrene block copolymer, the first solvent is a mixture of cyclohexane and toluene, the second solvent is methyl ethyl ketone and the third solvent is isopropyl alcohol. When the elastosol thus formed was spread on a primed steel surface and air dried, a fragile coating without strength was formed. However, when this coating was subsequently heated for two minutes at 200° C., it fused to a strong, smooth, coherent and adherent film.

DETAILED DESCRIPTION OF THE INVENTION

A. Block Copolymer

The block copolymers employed in the present invention may have a variety of geometrical structures, since the invention does not depend on any specific geometrical structure, but rather upon the chemical constitution of each of the polymer blocks. Thus, the structures may be linear, radial or branched so long as each copolymer has at least two polymer end blocks A and at least one polymer mid block B as defined above. Methods for the preparation of such polymers are known in the art. Particular reference will be made to the use of lithium based catalysts and especially lithium-alkyls for the preparation of the precursor polymers (polymers before hydrogenation). U.S. Pat. No. 3,595,942 not only describes some of the polymers of the instant invention but also describes suitable methods for their hydrogenation. The structure of the polymers is determined by their methods of polymerization. For example, linear polymers result by sequential introduction of the desired monomers into the reaction vessel when using such initiators as lithium-alkyls or dilithiostilbene and the like, or by coupling a two segment block copolymer with a difunctional coupling agent. Branched structures, on the other hand, may be obtained by the use of suitable coupling agents having a functionality with respect to the precursor polymers of three or more. Coupling may be effected with multifunctional coupling agents such as dihaloalkanes or -alkenes and divinyl benzene as well as certain polar compounds such as silicon halides, siloxanes or esters of monohydric alcohols with carboxylic acids. The presence of any coupling residues in the polymer may be ignored for an adequate description of the polymers forming a part of the compositions of this invention. Likewise, in the generic sense, the specific structures also may be ignored. The invention applies especially to the use of selectively hydrogenated polymers having the configuration before hydrogenation of the following typical species:

polystyrene-polybutadiene-polystyrene (SBS)
polystyrene-polyisoprene-polystyrene (SIS)
poly(alpha-methylstyrene)-polybutadiene-poly(alpha-methylstyrene) and
poly(alpha-methylstyrene)-polyisoprene-poly(alpha-methylstyrene).

It will be understood that both blocks A and B may be either homopolymer or random copolymer blocks as long as each block predominates in at least one class of the monomers characterizing the blocks and so long as the A blocks individually predominate in monoalkenyl arenes and the B blocks individually predominate in dienes. The term "monoalkenyl arene" will be taken to include especially styrene and its analogs and homologs including alpha-methylstyrene and ring-substituted styrenes, particularly ring-methylated styrenes. The preferred monoalkenyl arenes are styrene and alpha-methylstyrene, and styrene is particularly preferred. The blocks B may comprise homopolymers of butadiene or isoprene and copolymers of one of these two dienes with a monoalkenyl arene as long as the blocks B predominate in conjugated diene units. When the monomer employed is butadiene, it is preferred that between about 35 and about 65 mol percent of the condensed butadiene units in the butadiene polymer block have 1,2 configuration. Thus, when such a block is hydrogenated, the resulting product is, or resembles, a random copolymer block of ethylene and butene-1 (EB). If the conjugated diene employed is isoprene, the resulting hydrogenated product is or resembles a regular copolymer block of ethylene and propylene (EP).

Hydrogenation of the precursor block copolymers is preferably effected by use of a catalyst comprising the reaction products of an aluminum alkyl compound with nickel or cobalt carboxylates or alkoxides under such conditions as to substantially completely hydrogenate at least 80% of the aliphatic double bonds while hydrogenating no more than about 25% of the alkenyl arene aromatic double bonds. Preferred block copolymers are those where at least 99% of the aliphatic double bonds are hydrogenated while less than 5% of the aromatic bonds are hydrogenated.

The average molecular weights of the individual blocks may vary within certain limits. In most instances, the monoalkenyl arene blocks will have number average molecular weights in the order of 5,000–125,000, preferably 7,000–60,000 while the conjugated diene blocks either before or after hydrogenation will have average molecular weights in the order of 10,000–300,000, preferably 30,000–150,000. The total average molecular weight of the block copolymer is typically in the order of 25,000 to about 250,000, preferably from about 35,000 to about 200,000. These molecular weights are most accurately determined by tritium counting methods or osmotic pressure measurements.

The proportion of the monoalkenyl arene blocks should be between about 8 and 65% by weight of the block copolymer, preferably between about 10 and 30% by weight.

B. Solvents

A key aspect of the present invention is the series of separate steps with different solvent systems. One convenient way to select the solvents for the present invention is by reference to the Hildebrand solubility parameter. Hildebrand's solubility parameter is a measure of the total forces holding the molecules of a solid or liquid together. It has units of $(cal/cm^3)^{\frac{1}{2}}$. Every compound is characterized by a specific value of solubility parameter. In general, materials having the same or close to the same solubility parameter tend to form homogeneous mixtures or to be miscible. Those with appreciably different solubility parameters tend to form separate layers or to be mutually insoluble. A hydrocarbon polymer will usually dissolve in those hydrocarbon solvents with solubility parameters close to that of the polymer itself. In general, the higher the molecular weight of the polymer, the closer the solubility parameter must be matched. The relationships involved in the solubility parameter concept are less definite with oxygenated and halogenated compounds, where polar and hydrogen bonding forces become increasing important. Even in those cases, however, solubility parameters can aid in correlating and predicting solubilities. As used herein and in the claims, solubility parameters are expressed in terms of Hildebrand units which are the square root of calories per cubic centimeter of the solvent. A discussion of suitable solvents and solubility parameter may be found in the Journal of Paint Technology, vol. 38, May 1966, page 269 eg seq. and in the Encyclopedia of Polymer Science and Technology, vol. 13, p. 833 et sq., Interscience Publishers, New York (1965).

The block copolymers employed herein have different solubility parameters for each block. Typical solubility parameters are as follows:

| "A" block | polystyrene | 9.1 |
|---|---|---|
| "B" block | hydrogenated poly(50% 1,2 butadiene) or EB | 7.9 |
|  | hydrogenated poly(isoprene) or EP | 8.0 |

Table 1 below lists the solubility parameters for a large number of solvents, where the solvents are listed by chemical type:

TABLE 1

Solubility parameters of solvents by chemical types

| | Solubility parameter $(cal/cm^3)$ | | Solubility parameter $(cal/cm^3)$ |
|---|---|---|---|
| Aliphatic hydrocarbons: | | Esters: | |
| Butadiene | 6.7 | Isobutyl n-butyrate | 7.8 |
| Isobutylene | 6.7 | Isopropyl isobutyrate | 7.9 |
| Low odor mineral spirits | 6.9 | Methyl amyl acetate | 8.2 |
| Pentane | 7.0 | Butyl butyrate | 8.1 |
| Isoprene | 7.2 | Sec. butyl acetate | 8.2 |
| Hexane | 7.3 | Sec. amyl acetate | 8.3 |
| Heptane | 7.5 | Isobutyl acetate | 8.3 |
| Octane | 7.6 | Isopropyl acetate | 8.6 |
| VM&P naphtha | 7.6 | Amyl acetate | 8.5 |
| | | Butyl acetate | 8.6 |
| Aromatic hydrocarbons: | | Cellosolve acetate | 8.7 |
| Styrene | 8.7 | Propyl acetate | 8.8 |
| Ethylbenzene | 8.8 | Ethyl acetate | 9.1 |
| Xylene | 8.8 | Propyl formate | 9.2 |
| Toluene | 8.9 | Dibutyl phthalate | 9.4 |
| Benzene | 9.2 | Methyl acetate | 9.5 |
| Tetralin | 9.5 | Ethyl acetate | 9.1 |
| Naphthalene | 9.9 | Butyronitrile | 10.5 |
| | | Acetonitrile | 11.9 |
| | | Propylene carbonate | 13.3 |
| Other hydrocarbons: | | Ethylene carbonate | 14.7 |
| Methylcyclohexane | 7.8 | | |
| Turpentine | 8.1 | | |
| Cyclohexane | 8.2 | Ethers: | |
| Dipentene | 8.5 | Diethyl | 7.4 |

TABLE 1-continued

| Solubility parameters of solvents by chemical types | | | |
|---|---|---|---|
| | Solubility parameter (cal/cm$^3$) | | Solubility parameter (cal/cm$^3$) |
| | | Dimethyl | 8.8 |
| | | Dichloroethyl | 9.8 |
| Chlorinated hydrocarbons: | | Dioxane | 10.0 |
| 2,2-dichloropropane | 8.2 | Tetrahydrofuran | 9.9 |
| Carbon tetrachloride | 8.6 | | |
| 1,2-dichloropropane | 9.0 | | |
| Chloroform | 9.3 | Alcohols: | |
| Trichlorethylene | 9.3 | Butyl carbitol | 8.9 |
| Tetrachlorethylene | 9.4 | Butyl cellosolve | 9.1 |
| Chlorobenzene | 9.5 | Diethylene glycol | 9.1 |
| Methylene chloride | 9.7 | 2-ethylhexanol | 9.5 |
| Ethylene dichloride | 9.8 | Carbitol | 9.6 |
| o-Dichlorobenzene | 10.0 | Cellosolve | 9.9 |
| | | Methyl isobutyl carbinol | 10.0 |
| | | n-Octanol | 10.3 |
| Ketones: | | 2-ethylbutanol | 10.5 |
| Diisobutyl | 7.8 | n-Hexanol | 10.7 |
| Diisopropyl | 8.0 | Sec. butanol | 10.8 |
| Methyl isobutyl | 8.4 | n-Pentanol | 10.9 |
| Methyl amyl | 8.5 | n-Butanol | 11.4 |
| Methyl propyl | 8.7 | Cyclohexanol | 11.4 |
| Diethyl | 9.9 | Isopropanol | 11.5 |
| Isophorone | 9.1 | n-Propanol | 11.9 |
| Diacetone alcohol | 9.2 | Ethanol | 12.7 |
| Methyl cyclohexanone | 9.3 | Ethylene glycol | 14.2 |
| Methyl ethyl | 9.3 | Methanol | 14.5 |
| Cyclohexanone | 9.9 | Glycerol | 16.5 |
| Acetone | 10.0 | | |
| Cyclopentanone | 10.4 | | |
| Cyclobutadione | 11.0 | | |

[1]Trademark Union Carbide Corporation

Table 2 below is a representative selective of many common solvents showing their solubility parameters and other selected properties. Table 2 also shows whether the solvents will dissolve polystyrene, poly(ethylene-butylene) and both blocks of the subject selectively hydrogenated block copolymers. The solubilities in Table 2 represent solubilities of the polymers at 15% concentration at room temperature. As used in the table + = completely soluble; − = completely insoluble; * = very poor solubility, i.e., either the polymer is only swelled or only partially dissolved by the solvent; S = produces suspension with low viscosity; S* = produces suspension with moderate-to-high viscosity.

TABLE 2

| | Physical properties of some common solvents | | | | |
|---|---|---|---|---|---|
| Solvents | Solubility parameter | Saturates % | Polystyrene-soluble | Solubility Poly(ethylene-butylene) soluble | Block Copolymer soluble |
| Hydrocarbons | | | | | |
| Isooctane | 6.9 | 100 | − | + | − |
| TOLU-SOL® 5 | 7.2 | 97.1 | − | + | * |
| Hexane | 7.3 | 100 | − | + | * |
| Shell-Sol 70 | 7.4 | 99.1 | − | + | * |
| Heptane | 7.5 | 100 | * | + | * |
| VM&P naphtha 66W® | 7.5 | 92.0 | * | + | + |
| Shell-Sol 340EC | 7.6 | 95.1 | * | + | + |
| Shell-Sol 140 | 7.7 | 95.8 | * | + | + |
| Shell mineral spirits 135-66 | 7.7 | 93.0 | * | + | + |
| VM&P naphtha EC® | 7.7 | 90.8 | * | + | + |
| Tolu-Sol 6 | 7.7 | 93.7 | * | + | + |
| Shell-Sol M-75 | 7.7 | 91.7 | * | + | + |
| Methylcyclo-hexane | 7.8 | 100 | + | + | + |
| Cyclohexane | 8.2 | 100 | + | + | + |
| Ethylbenzene | 8.8 | 0 | + | + | + |
| Toluene | 8.9 | 0 | + | + | + |
| Ketones (unbranched) | | | | | |
| Methyl-N-Butyl ketone | 8.5 | − | + | − | S |
| Methyl N-Amyl ketone | 9.0 | − | + | − | S |
| Methyl ethyl ketone | 9.3 | − | + | − | − |

TABLE 2-continued

Physical properties of some common solvents

| Solvents | Solubility parameter | Saturates % | Polystyrene-soluble | Solubility Poly(ethylene-butylene) soluble | Block Copolymer soluble |
|---|---|---|---|---|---|
| Cyclohexanone | 9.9 | — | + | — | — |
| Diethyl ketone | 9.9 | — | + | — | — |
| Acetone | 10.0 | — | + | — | — |
| Esters | | | | | |
| Isobutyl isobutyrate | 8.0 | — | + | — | + |
| Methyl N-Amyl acetate | 8.2 | — | + | — | S* |
| N-amyl acetate | 8.5 | — | + | — | S* |
| N-butyl acetate | 8.6 | — | + | — | S* |
| Isopropyl acetate | 8.6 | — | + | — | — |
| Ethyl acetate | 9.1 | — | + | — | — |
| Methyl acetate | 9.5 | — | + | — | — |
| Ethers and glycol ethers | | | | | |
| Butyl OXITOL® glycol ether | 8.9 | — | — | — | — |
| Tetrahydrofuran | 9.9 | — | + | + | + |
| Dioxane | 10.0 | — | + | — | — |
| Alcohols | | | | | |
| 2-Ethyl hexanol | 9.5 | — | — | — | — |
| Methyl isobutyl carbinol | 10.0 | — | — | — | — |
| t-Butyl alcohol | 10.2 | — | — | — | — |
| 2-Butyl alcohol | 10.8 | — | — | — | — |
| Ethyl alcohol | 12.1 | — | — | — | — |
| Isopropyl alcohol | 11.5 | — | — | — | — |
| Miscellaneous | | | | | |
| Carbon tetrachloride | 8.6 | — | + | + | + |
| Carbon disulfide | 9.9 | — | + | + | + |

The above two tables are useful in selecting the particular solvents to be employed.

In the first step, the block copolymer is dissolved in a first solvent, which first solvent is a good solvent for both the A blocks and the B blocks. The first solvents especially useful in this invention have solubility parameters between about 7.0 and 9.2, preferably between about 8.0 and 9.0 $(cal/cm^3)^{\frac{1}{2}}$. A preferred group of solvents falling within the scope of the present invention are the following:

| First Solvents | Hildebrand solubility parameter $(cal/cm^3)^{\frac{1}{2}}$ |
|---|---|
| Benzene | 9.2 |
| Trichloroethylene | 9.2 |
| Carbon tetrachloride | 8.6 |
| 1,1,1-trichloroethane | 8.5 |
| Cyclohexane | 8.2 |
| 2,2-dichloropropane | 8.2 |
| Ethylamylketone | 8.2 |
| Dipentene | 8.5 |
| Ethylbenzene | 8.8 |
| Methyl cyclohexane | 7.8 |
| Toluene | 8.9 |
| Xylene | 8.8 |

Hydrocarbon solvents are especially preferred. Single solvents may be utilized but certain pairs of solvents have been found to result in unexpectedly low solution viscosity. When pairs of solvents are employed, the limitation is that the average solubility parameter should fall within the range given above. The use of multicomponent solvent mixtures with a balance of solution viscosity, volatility, residual solvents, characteristics, etc., is probably optimum, using art known in the coatings field. It is preferred that if binary solvent systems are utilized one of the solvents should have a solubility parameter closely matching that of one of the polymer block types while the other solvent should have a solubility parameter closely matching that of the second polymer block type. By "closely matching" is meant a solvent having a solubility parameter within about 0.5 units of that of the polymer block species. Suitable pairs of solvents comprise mixtures of cyclohexane and toluene, cyclohexane and benzene, or methylcyclohexane and toluene.

In the next step, a second solvent is added to the above solution, therein resulting in the precipitation of the midblocks B and the formation of a suspension of micelles. The second solvent should be a good solvent for the A block and a poor solvent for the B block. Preferably, the second solvent should have a Hildebrand's solubility parameter of about 9.2 to about 10. A preferred group of solvents for use as the second solvent includes the following:

| Seconds Solvents | Hildebrand solubility parameter $(cal/cm^3)^{\frac{1}{2}}$ |
|---|---|
| Methyl ethyl ketone (MEK) | 9.3 |
| Cyclohexanone | 9.9 |
| Diethyl ketone | 9.9 |
| Acetone | 10.0 |
| Methyl acetate | 9.5 |
| Dioxane | 10.0 |

After the addition of the second solvent, the polystyrene end blocks dissolve, and the poly(ethylene/butylene) midblocks contract or collapse in the formation of micelles. This system resembles a colloidal suspension rather than a true solution, and is analogous to a dilute latex held in solution by a surfactant.

In the next step, a third solvent is added to the suspension of miscelles formed above, therein precipating the elastosol paste. The third solvent is a poor solvent for both the A block and the B block, and has a Hildebrand's solubility parameter greater than about 10. A preferred group of solvents for use as the third solvent includes the following:

| Third Solvents | |
|---|---|
| | Hildebrand solubility parameter $(cal/cm^3)^{\frac{1}{2}}$ |
| Isopropyl alcohol | 11.5 |
| t-Butyl alcohol | 10.2 |
| sec-Butyl alcohol | 10.8 |
| Ethyl alcohol | 12.1 |

In a preferred embodiment, the first solvent is a mixture of cyclohexane and toluene, the second solvent is methyl ethyl ketone and the third solvent is isopropyl alcohol.

The amount of each solvent to be employed depends upon a number of factors including: other solvents used in the sequential procedure; temperature; composition and molecular weight of the block copolymer. The relative amounts of solvents per 100 parts by volume block copolymer are listed below in parts by volume:

| | Preferred range | More preferred range |
|---|---|---|
| First solvent | 200 to 600 | 350 to 450 |
| Second solvent | 200 to 500 | 300 to 400 |
| Third solvent | 200 to 400 | 125 to 250 |

After the addition of the third solvent, the elastosol paste precipitates. The "solution" is then allowed to settle and the excess solvent is decanted from the paste. The resulting paste can easily be spread on a substrate at room temperature. After the paste is applied to the substrate (usually a primed substrate), the coating is heated at a temperature of about 150° to about 225° C., depending on the various factors: viscosity of block polymer, thickness of coating, heat capacity of substrate, optimum time cycle, etc. therein removing the residual solvent and resulting in a strong, coherent coating.

It is also within the scope of the invention that additional fillers, tackifying resins, and additives may be employed with the block copolymer.

The invention is further illustrated by reference to the following Illustrative Embodiment which is given for the purpose of illustration only, and is not meant to limit the invention to the particular reactants and conditions employed therein.

ILLUSTRATIVE EMBODIMENT I

In Illustrative Embodiment I, the block copolymer employed was a selectively hydrogenated styrene-butadiene-styrene block copolymer according to the present invention having a molecular weight distribution of 10,000–50,000–10,000. The block copolymer was dissolved in a first solvent comprising an 85/15% volume blend of cyclohexane and toluene. About 12 parts by weight block copolymer and 88 parts by weight combined solvent were employed. The block copolymer was completely dissolved. Then, sufficient methyl ethyl ketone (MEK) was added as the second solvent to cause cloudiness in the solution. This indicated that midblocks were precipitating, therein resulting in the formation of micelles. A small excess of MEK was then added. Isopropyl alcohol (IPA) was then added as the third solvent. The amount of IPA was that amount required to be just short of complete coagulation. The solution was allowed to settle for 24 hours and the excess solvent was decanted off from the paste-like residue. The actual amounts of material in the final solution before decantation were 4% by weight block copolymer and 96% by weight combined solvent where the solvent was cyclohexane/toluene/MEK/IPA in a volume ratio of 30/5/45/20. Residual solvent after decantation was less than 5% of total. When the elastosol thus formed was spread on a primed (Hercoprime 15X) steel surface and air dried, a fragile coating without strength was formed. However, when this coating was subsequently heated for two minutes at 200° C., it fused to a strong, smooth, coherent and adherent film.

What is claimed is:

1. A process for preparing a paste suitable for the preparation of dispersions and coatings comprising:
   (a) dissolving a block copolymer in a first solvent where said block copolymer comprises at least two monoalkenyl arene polymer end blocks A and at least one substantially completely hydrogenated conjugated diene polymer mid block B and said first solvent dissolves both the A blocks and the B blocks and has a Hildebrand's solubility parameter within the range of about 7 to about 9.2 $(cal/cm^3)^{\frac{1}{2}}$;
   (b) adding a second solvent to the solution of step a), wherein said second solvent is a good solvent for the A block and a poor solvent for the B block, and said second solvent has a Hildebrand's solubility parameter within the range of about 9.2 to about 10 $(cal/cm^3)^{\frac{1}{2}}$, therein resulting in the precipitation of the midblocks B and the formation of a suspension of micelles; and
   (c) adding a third solvent to the suspension of micelles formed in step (b), wherein the third solvent is a poor solvent for both the end blocks A and the midblocks B, and has a Hildebrand's solubility parameter greater than about 10 $(cal/cm^3)^{\frac{1}{2}}$, therein precipitating an elastosol plate.

2. The process according to claim 1 wherein said block copolymer is a selectively hydrogenated styrene-butadiene block copolymer of the general formula (S-EB)$_x$ where x is from 2 to 10.

3. The process according to claim 1 or 2 wherein said first solvent is selected from the group consisting of benzene, trichloroethylene, carbon tetrachloride, 1,1,1-trichloroethane, cyclohexane, 2,2-dichloropropane, ethylamylketone, dipentane, ethylbenzene, methyl cyclohexane, toluene, xylene and mixtures thereof; said second solvent is selected from the group consisting of methyl ethyl ketone, cyclohexanone, diethyl ketone, acetone, methyl acetate and dioxane; and said third solvent is selected from the group consisting of isopropyl alcohol, t-butyl alcohol, sec-butyl alcohol, and ethyl alcohol.

4. The process according to claim 3 wherein said first solvent is a mixture of cyclohexane and toluene, said second solvent is methyl ethyl ketone and said third solvent is isopropyl alcohol.

5. The process according to claim 1 wherein between about 200 and about 600 parts by volume first solvent, between about 200 and about 500 parts by volume second solvent, and between about 200 and about 400 parts by volume third solvent are employed per 100 parts by volume block copolymer.

6. The process according to claim 1 including the step of decanting excess solvent from said elastosol paste.

7. The paste formed by the process of claim 1.

* * * * *